United States Patent [19]

Champenois

[11] 4,101,269
[45] Jul. 18, 1978

[54] DYED POLYMERS AND COPOLYMERS HAVING A CYANOVINYL-AZO DYE INCORPORATED IN THE STRUCTURE THEREOF

[75] Inventor: Michel Maurice Luce Champenois, Le Mesnil Esnard, France

[73] Assignee: Produits Chimiques Ugine Kuhlmann, Paris, France

[21] Appl. No.: 761,570

[22] Filed: Jan. 24, 1977

[30] Foreign Application Priority Data

Aug. 2, 1974 [FR] France .............................. 74 26847

[51] Int. Cl.$^2$ ........................... D06P 3/00; D06P 5/00
[52] U.S. Cl. ......................................... 8/4; 8/DIG. 7;
8/41 R; 260/30.4 N; 260/879; 526/91; 526/93;
526/232.1; 526/259; 526/263; 526/264;
526/265; 526/266; 526/284; 526/298; 528/86
[58] Field of Search ............... 8/DIG. 7, 4, 41 R;
260/47 UA, , 879; 526/259, 263, 266, 284, 292,
264, 265, 298

[56] References Cited

U.S. PATENT DOCUMENTS

| 3,503,087 | 3/1970 | Wolf et al. ................................. 8/164 |
| 3,557,048 | 1/1971 | Wilhelm et al. ................. 260/30.4 N |
| 3,594,110 | 7/1971 | Happe et al. .................................. 8/4 |
| 3,627,472 | 12/1971 | Parsons et al. ............................... 8/4 |
| 3,637,581 | 1/1972 | Horiguchi et al. ............................ 8/4 |

FOREIGN PATENT DOCUMENTS

| 252,859 | 3/1967 | Austria. |
| 2,091,873 | 1/1972 | France. |
| 1,291,903 | 3/1962 | France. |
| 1,282,978 | 11/1968 | Fed. Rep. of Germany. |
| 1,139,092 | 11/1962 | Fed. Rep. of Germany. |
| 651,242 | 1/1963 | Italy. |
| 1,309,876 | 3/1973 | United Kingdom. |

*Primary Examiner*—A. Lionel Clingman
*Attorney, Agent, or Firm*—Beveridge, DeGrandi, Kline & Lunsford

[57] ABSTRACT

Structurally dyed random polymers and copolymers characterized in that their chain comprises a dye of the formula:

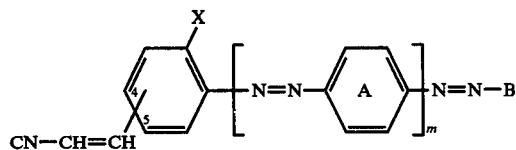

wherein the residue —CH=CH—CN is fixed in position 4 or 5, X represents a hydrogen or halogen atom, the benzene ring A can be substituted by halogen atoms, alkyl, alkoxy or acylamino groups, m represents 0 or 1 and B represents the residue of a coupling component, either substituted or unsubstituted and which is free of sulfonic or carboxylic acid groups. Such dyed polymers and copolymers are intensely dyed and useful for making yarns, molded articles, varnishes, synthetic resins, synthetic fibers, and the like. The dye forms an integral part of the chain structure of the polymers and copolymers.

17 Claims, No Drawings

DYED POLYMERS AND COPOLYMERS HAVING A CYANOVINYL-AZO DYE INCORPORATED IN THE STRUCTURE THEREOF

CROSS-REFERENCE TO RELATED APPLICATION

This application is a continuation-in-part of application Ser. No. 600,536, filed July 31, 1975, now abandoned, the entire disclosure of which is relied upon and incorporated herein by reference.

BACKGROUND OF THE INVENTION

The present invention has for its object structurally dyed macromolecular materials.

It is known how to copolymerize vinyl monomers such as styrene, acrylonitrile, vinyl chloride, vinyl acetate, and the like, with dyed agents or dyes having groups able to take part in a copolymerization reaction. Some of these agents or dyes do not have sufficient dyeing power. This is the case, for example, for imides derived from aminoazobenzene, aminoanthraquinone and acryloylamino-anthraquinones. Other agents or dyes, for example, standard azo dyes, do not have sufficient fastness.

SUMMARY OF THE INVENTION

Now, it has been found, according to the present invention, that it is possible to obtain intensely dyed random polymers and copolymers in which the molecules of the dyes are part of the macromolecular chain, by using dyes derived from cinnamonitrile.

The dyes can be represented by the general formula:

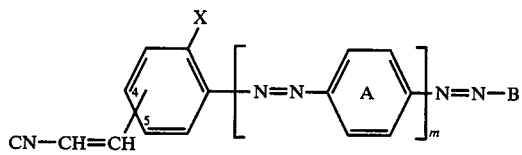

wherein the residue —CH=CH—CN is fixed in position 4 or 5, X represents a hydrogen or halogen atom, the benzene ring A can be substituted by halogen atoms, alkyl, alkoxy or acylamino groups, $m$ represents 0 or 1 and B represents the residue of a coupling component, either substituted or unsubstituted, said coupling component being free of sulfonic or carboxylic acid groups.

DETAILED DESCRIPTION

The alkyl and alkoxy substituents of the ring A can contain 1 to 8 carbon atoms, preferably 1 to 4 carbon atoms. The acylamino substituent of the ring A can be formylamino, acetylamino, propanoylamino, benzoylamino or cinnamoylamino.

The coupling components of residue B can belong to the most diverse series, such as that of benzene, naphthalene, quinoline, carbazole, diphenyleneoxide, indazole, coumarin, acylacetarylides, pyrazolones, hydroxyquinolines and indole.

The dyes of formula (I) can be prepared by diazotation of a base of the general formula:

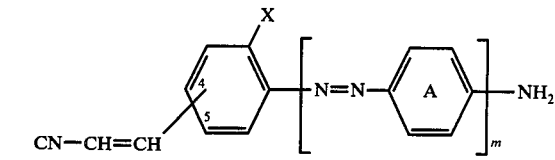

and coupling of the diazo derivative with an H-B coupling component, X, A, $m$ and B having the same significance as above.

The dyes of formula (I) are known products. They have been described in French patent 70.08829 (2,091,873, of March 12, 1970, in the name of Produits Chimiques Ugine Kuhlmann, (British patents equivalent: 1,309,876 and 1,309,877), and the disclosure of this French patent is incorporated by reference. They were conceived for dyeing of synthetic textile fibers. It has been found, according to one embodiment of the present invention, that these dyes, thanks to their cyanovinyl group, can take part in a polymerization or copolymerization reaction. One or more dyes can be used during copolymerization with the base colorless monomers.

As base monomers can be cited:
styrene and its substituted derivatives,
divinylbenzene,
polybutadiene oligomers having vinyl groups,
acrylic, methacrylic, crotonic, chloroacrylic, maleic and itaconic acids and their anhydrides, nitriles, esters, amides, N-monoalkylamides and N-dialkylamides,
ethyleneglycol diacrylate,
methylene-bis-acrylamide and methylene-bis-methacrylamide,
vinyl esters of saturated carboxylic acids (particularly vinyl acetate),
vinyl halides and vinylidene halides (particularly vinyl chloride),
vinylpyridines, vinylpyrrolidines, vinylquinolines,
N-vinyl-imidazole, N-vinyl-carbazole, N-vinyl-pyrolidones or N-vinyl-caprolactam.

These monomers can be used alone or in mixture. The mixtures make is possible to obtain copolymers of very varied nature and properties.

The structurally dyed random polymers and copolymers according to the invention can be obtained by radical polymerization of the base monomers with the dyes of formula (I), according to processes known in the art. The polymerization can be bulk polymerization, solution polymerization, suspension polymerization or emulsion polymerization. The initiators used in the polymerization of the base monomers with the dyes are the same as those used for radical polymerization of the base monomers alone. As such can be cited, for example, sodium, ammonium or potassium persulphate, cumene hydroperoxide, butyl hydroperoxide, benzoyl peroxide, peracetic acid, 2,2'-azo-bis-isobutyronitrile, 4,4'-azo-bis-(4-cyanopentanoic acid), the persulphate-ferricyanide, -persulphate-ferrous salt or glucosecerium (IV) and ammonium nitrate systems.

The polymerization takes place across the double bond of the cyanovinyl group of the dye on the one hand and the double bond of the polymerizable olefinically unsaturated group of the base monomers on the other hand.

The structurally dyed polymers and copolymers obtained may or may not be cross-linked depending upon whether the base monomers used contain several polymerizable olefinically unsaturated groups or only one. It has been shown by analyses, such as by infrared spectrography, nuclear magnetic resonance and by the impossibility of making a separation by solvents of the molecules of these dyes, that the dyes are included in the macromolecular chains.

To obtain dyed polymers and copolymers directly usable in their practical applications, such as spinning, molding, etc., it is possible to use from 0.1 to 2% by weight of dyes in relation to the base monomers. Such proportions are generally sufficient to obtain intense colorings of the resulting polymers and copolymers. Since it is not a grafting of the dye onto a pre-existing macromolecular support, a grafting which is always accompanied by secondary reactions, the physical and mechanical properties of the polymers and copolymers obtained according to the invention do not differ from those of polymers and copolymers of the same structure without dye.

The process according to the invention is particularly advantageous, because it offers the possibility of preparing, in a single stage, the dyed polymers or copolymers, whereas it is always necessary to have two stages in the standard method, namely, synthesis of the polymer followed by a dyeing or coloring in the mass.

The colorations obtained by the present invention are uniform, bright and have excellent fastness.

The dyes of formula (I) can be used in higher proportions, going up to about 50% by weight of the base monomers, to prepare usable polymers and copolymers, as master mixtures with a base of pigments, for coloring in the mass of varnishes, synthetic resins and synthetic fibers.

The following examples, in which the parts are understood by weight unless otherwise indicated, illustrate the invention without limiting it.

EXAMPLE 1

To 100 parts of water, deoxygenated by passage of a nitrogen current, are added, with stirring, 25 parts by volume of acrylonitrile (propenenitrile) and 0.025 part of 4'-cyanovinyl 4-phenylazo-1-phenyl-3-carbonamido-5-hydroxy pyrazole.

The reactor is heated to 50° C. There are added 5 parts of 0.03 N sulfuric acid and 0.3 parts of Mohr's salt (double iron ammonium sulfate). When the reactor is at suitable temperature (50° C), there are rapidly introduced 15 parts by volume of 0.5% potassium persulfate aqueous solution and 20 parts by volume of 0.95% sodium metabisulfite aqueous solution.

The mixture is polymerized for 1 hour. The copolymer obtained is filtered, washed with hot ethanol, redissolved in dimethylformamide and reprecipitated in hot ethanol, filtered, washed and dried.

The orange product obtained at a 90% yield has an intrinsic viscosity of 1.9 dl.g$^{-1}$ in dimethyl formamide at 25° C.

EXAMPLE 2

Into a reactor set at a temperature of 50° C, are introduced 100 parts of anhydrous dimethylformamide, 25 parts by volume of acrylonitrile and 0.5 part of 4'-cyanovinyl-6-phenylazo-1-methyl-3-diethylamino benzene.

The solution is deoxygenized by passage of a nitrogen current for 15 minutes as in Example 1. There are then added 0.2 part of copper acetate and 0.3 part of potassium persulfate. The mixture is kept for 3 hours at 50° C, and then the excess acrylonitrile is distilled under vacuum. The viscous solution obtained can be poured into hot ethanol (the precipitate is then filtered, washed, dried) or used directly for making yarns by the wet or dry method. These latter are dyed a scarlet shade.

EXAMPLE 3

Into a reactor provided with an agitation device, a nitrogen bubbling device and a temperature regulating device, are introduced 125 parts of water, 1 part of glucose, 1 part of acrylamide and 0.5 part of 4'-cyanovinyl-3-phenylazo-4-hydroxy-1-methyl benzene.

The mixture is deoxygenized by passage of a nitrogen current for 10 minutes. The temperature is adjusted to 40° C and there is rapidly introduced a solution comprising 0.25 part of cerium (IV) and ammonium nitrate and 0.5 part of 1N nitric acid in 10 parts of water. The polymerization is continued for 2 hours. The yellow precipitate formed is then filtered, washed in hot water, then in hot alcohol and cold water and then dried.

There is obtained a polymer having a very strong orange coloration and an intrinsic viscosity of 3.2 dl.g$^{-1}$ (dimethylformamide at 25° C).

EXAMPLE 4

In a reactor, there are placed 100 parts of water, 2 parts of sodium hydroxide in pellets and 4 parts of capric acid. The mixture is heated 15 minutes at 45° C and then cooled at ambient temperature. It is deoxygenized by passage of nitrogen. There is introduced, with vigorous stirring, 0.5 part of the dye used in Example 1, and 20 parts by volume of styrene, 25 parts by volume of acrylonitrile and 10 parts of acrylamide are added. The polymerization initiator made up of 0.090 part of potassium persulfate and 0.020 part of potassium ferricyanide is introduced. The speed of agitation is then reduced to 100 rpm and the reactor heated at 45° C for an hour.

The emulsion is then poured in ethanol and then filtered; the precipitate is taken up in boiling ethanol, filtered, dried.

The yield is of the order of 90%. The products obtained are dyed a very strong yellow and can be used for making hot molded objects.

EXAMPLE 5

A mixture comprising 150 parts of water, 20 parts of glucose, 10 parts of acrylamide, 25 parts by volume of acrylonitrile and 25 parts by volume of vinyl acetate is brought to 50° C with stirring and deoxygenized with nitrogen. There are then introduced 1 part of 5'-cyanovinyl-8-phenylazo-7-hydroxy coumarin and 0.7 part of cerium (IV) and ammonium nitrate, and the mixture is left 1 hour, with stirring. The residual monomers are then eliminated by distillation under vacuum; then the mixture is precipitated in hot methanol. The precipitate is filtered, washed and dried.

There is obtained a polymer dyed a greenish yellow, easily usable upon being heated to form molded objects or yarns.

EXAMPLE 6

In a reactor there are placed 100 parts of water, 2 parts of sodium hydroxide in pellets and 3.2 parts of capric acid. The mixture is heated 15 minutes at 45° C with stirring and argon bubbling; it is then cooled to 25° C. There are then added 25 parts by volume of acrylonitrile, 25 parts by volume of styrene, 9 parts of acrylamide, 0.2 part of dye used in Example 1 and 0.2 part of 4'-cyanovinyl-2'-chloro-6-phenylazo-3-dimethylamino-1-acetylamino benzene. There are then added 0.090 part of potassium persulfate and 0.020 part of potassium ferricyanide. The stirring is reduced to 100 rpm and the temperature held at 45° C for 3 hours.

The emulsion is treated as in Example 4 and there are obtained 40 parts of a reddish orange copolymer.

EXAMPLE 7

In a reactor are placed 20 parts by volume of styrene and 0.5 part of 5'-cyanovinyl-6-phenylazo-3-dimethylamino-1-acetylamino benzene in solution in 2 parts of dimethylformamide; the mixture is deoxygenized by passage of nitrogen; there is then added 0.050 part of benzoyl peroxide and the mixture is then hermetically sealed and kept at 60° C for 24 hours. The hot polymer is then poured into ethanol with very vigorous stirring. The precipitate is filtered, washed and dried. There are obtained 13 parts of orange dyed polymer with an intrinsic viscosity of 0.6 dl.g$^{-1}$ (benzene, 25° C).

EXAMPLE 8

Into a reactor are introduced 50 parts of water, 0.132 part of potassium persulfate, 0.050 part of disodium phosphate and 0.5 part of sodium laurylsulfate, and the mixture is stirred under nitrogen for 15 minutes. There are then introduced 20 parts by volume of styrene and 0.5 part of the dye of Example 3 in solution in 2 parts of dimethylformamide. It is heated for one hour at 60° C in a nitrogen atmosphere. The emulsion is then poured into hot ethanol. The precipitate obtained is filtered, washed and dried. There are obtained 14 parts of copolymer of intense orange-red coloration having an intrinsic viscosity of 4 dl.g$^{-1}$ (benzene, 25° C).

EXAMPLE 9

In a reactor provided with a stirring device and a nitrogen intake are placed 20 parts by volume of styrene, 80 parts by volume of toluene, 0.050 part of azobisisobutyronitrile and there is added 0.050 part of the dye of Example 1 in solution in 10 parts of dimethyl formamide. It is heated at 100° C for 24 hours in a nitrogen atmosphere.

The solution obtained is poured into ethanol. The precipitate is filtered, washed in hot ethanol and dried. The copolymer thus obtained is of an orange-yellow color and has an intrinsic viscosity of 0.3 dl.g$^{-1}$ (benzene, 25° C).

EXAMPLE 10

The copolymer obtained according to the procedure of Example 1 with 5 parts of dye per 25 parts by volume of acrylonitrile is introduced either in solution or in precipitate form in a polyacrylonitrile-dimethylformamide collodion in a proportion of 1 part of dyed copolymer per 40 parts of polyacrylonitrile. Homogenizing of the mixture is very rapid and the yarns obtained according to known processes present a uniform intense yellow coloration.

EXAMPLE 11

150 parts of demineralized water are introduced into a reactor provided with a stirring device. 0.2 part of disodium phosphate and 0.5 part of sodium lauryl-sulphate are added with stirring. Then a solution of 20 parts of a polybutadiene with carboxy end-groupings, having a molecular weight of 2000 and 20% vinyl unsaturation, in 50 parts of benzene and a solution of 2 parts of 4'-cyanovinyl-1-phenylazo-2-hydroxy-naphthalene in 5 parts of dimethylformamide are simultaneously added with vigorous stirring in order to form an emulsion. The reactor is heated to 55° C, and 0.5 part of ammonium persulphate in 5 parts of water are introduced. The reaction mixture rapidly becomes very viscous. After stirring during three hours, the latex obtained is poured into 500 parts of alcohol and the precipitate is filtered off.

The copolymer thus obtained with a nearly quantitative yield is bright-red. It may be used for all known applications of the oligomers of polybutadiene.

What is claimed is:

1. Structurally dyed random polymer or copolymer resulting from the radical polymerization of one or more colorless base monomers having a polymerizable olefinically unsaturated group and one or more dyes of the formula:

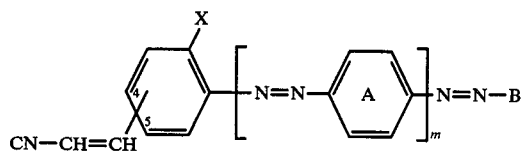

wherein —CH=CH—CN is fixed in position 4 or 5, X represents a hydrogen or halogen atom, the benzene ring A is unsubstituted or substituted by halogen atoms, alkyl, alkoxy or acylamino groups, m represents 0 or 1, and B represents the residue of a coupling component BH either substituted or unsubstituted, said coupling component being free of sulfonic and carboxylic acid groups, said polymerization taking place across the double bond of the cyanovinyl group of the dye and the double bond of the polymerizable olefinically unsaturated group of the base monomers.

2. A structurally dyed random polymer or copolymer as defined in claim 1 wherein said coupling component BH belongs to a series selected from the group consisting of benzene, naphthalene, quinoline, carbazole, diphenyleneoxide, indazole, coumarin, acylacetarylides, pyrazolones, hydroxy quinolines and indole series.

3. A structurally dyed random polymer or copolymer as defined in claim 1 wherein said colorless base monomers are selected from the group consisting of styrene and its substituted derivatives; divinylbenzene; polybutadiene oligomers having vinyl groups; acrylic, methacrylic, crotonic, chloroacrylic, maleic and itaconic acids and their anhydrides, nitriles, esters, amides, N-monoalkylamides, N-dialkylamides; ethyleneglycol diacrylate; methylene-bis-acrylamide; methylene-bis-methacrylamide; vinyl esters of saturated carboxylic acids; vinyl halides; vinylidene halides; vinylpyridines; vinylpyrrolidines; vinylquinolines; N-vinyl-imidazole; N-vinyl-carbazole, N-vinyl-pyrrolidones or N-vinyl-caprolactam.

4. A structurally dyed random polymer or copolymer as defined in claim 1 wherein said dye is present in an amount of from 0.1 to 2% by weight, based on the weight of the base monomers.

5. A structurally dyed random polymer or copolymer as defined in claim 1 wherein said dye is present in an amount of from more than 2% to about 50% by weight, based on the weight of the base monomers.

6. A structurally dyed random polymer as defined in claim 4 wherein said base monomer is acrylonitrile and said dye is 4′-cyanovinyl-4-phenylazo-1-phenyl-3-carbonamido-5-hydroxy pyrazole.

7. A structurally dyed random polymer as defined in claim 4 wherein said base monomer is acrylonitrile and said dye is 4′-cyanovinyl-6-phenylazo-1-methyl-3-diethylamino benzene.

8. A structurally dyed random polymer as defined in claim 5 wherein said base monomer is acrylamide and said dye is 4′-cyanovinyl-3-phenylazo-4-hydroxy-1-methyl benzene.

9. A structurally dyed random copolymer as defined in claim 4 wherein said base monomer is a mixture comprising styrene, acrylonitrile and acrylamide, and said dye is 4′-cyanovinyl-4-phenylazo-1-phenyl-3-carbonamido-5-hydroxy pyrazole.

10. A structurally dyed random copolymer as defined in claim 4 wherein said base monomer is a mixture comprising acrylamide, acrylonitrile and vinyl acetate, and said dye is 5′-cyanovinyl-8-phenylazo-7-hydroxycoumarin.

11. A structurally dyed random copolymer as defined in claim 4 wherein said base monomer is a mixture comprising styrene, acrylonitrile and acrylamide and said dye is 4′-cyanovinyl-2′-chloro-6-phenylazo-3-dimethylamino-1-acetylamino benzene.

12. A structurally dyed random polymer as defined in claim 5 wherein said base monomer is styrene and said dye is 5′-cyanovinyl-6-phenylazo-3-dimethylamino-1-acetylamino benzene.

13. A structurally dyed random polymer as defined in claim 5 wherein said base monomer is styrene and said dye is 4′-cyanovinyl-3-phenylazo-4-hydroxy-1-methyl benzene.

14. A structurally dyed random polymer as defined in claim 4 wherein said base monomer is styrene and said dye is 4′-cyanovinyl-4-phenylazo-1-phenyl-3-carbonamido-5-hydroxy pyrazole.

15. A structurally dyed random polymer as defined in claim 5 wherein said base monomer is a polybutadiene oligomer with carboxy end-groupings, having a molecular weight of 2000 and 20% vinyl unsaturation, and said dye is 4′-cyanovinyl-1-phenylazo-2-hydroxy-naphthalene.

16. A structurally dyed random polymer or copolymer as defined in claim 1 wherein said colorless base monomers are selected from the group consisting of vinyl acetate and vinyl chloride.

17. A structurally dyed random polymer as defined in claim 5 wherein said base monomer is acrylonitrile and said dye is 4′-cyanovinyl-4-phenylazo-1-phenyl-3-carbonamido-5-hydroxy pyrazole.

* * * * *